Jan. 12, 1937. H. P. DAHLSTRAND ET AL 2,067,479
BLOWER CONTROL SYSTEM
Filed Feb. 8, 1935
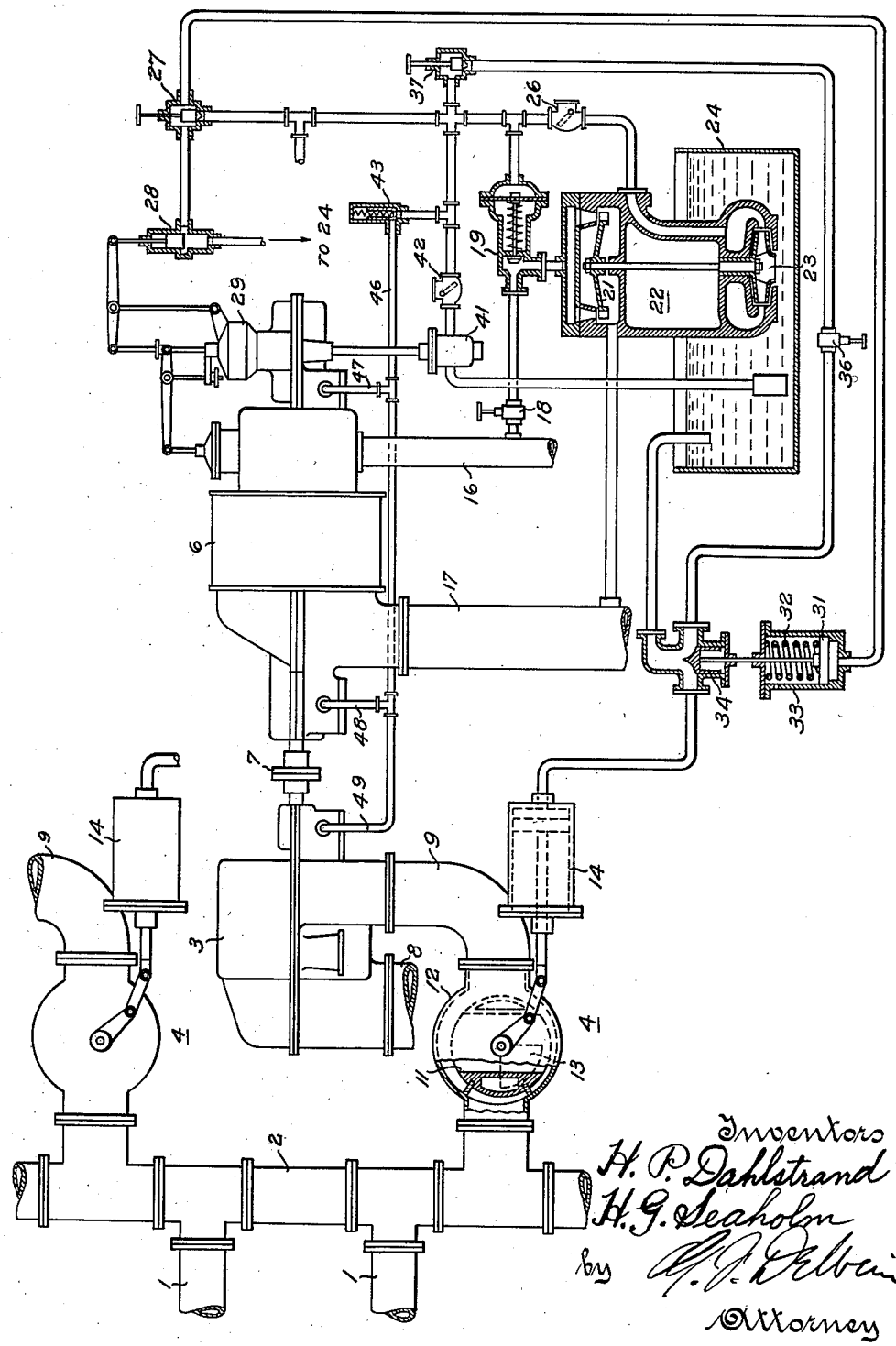
Inventors
H. P. Dahlstrand
H. G. Seaholm
by
Attorney Patented Jan. 12, 1937

2,067,479

UNITED STATES PATENT OFFICE 2,067,479

BLOWER CONTROL SYSTEM

Hans P. Dahlstrand, Wauwatosa, and Herman G. Seaholm, Milwaukee, Wis., assignors to Allis-Chalmers Manufacturing Company, Milwaukee, Wis., a corporation of Delaware Application February 8, 1935, Serial No. 5,524

10 Claims. (Cl. 103—40)

This invention relates to improvements in systems for controlling the operation of centrifugal machines and more particularly to means for controlling the connection of a centrifugal machine discharging into a header common to a plurality of such machines.

When a plurality of centrifugal machines, such as, for example, blowers of the centrifugal type, are connected to discharge into a common header, it is necessary to provide means which will prevent flow of air into any blower from the header under any circumstances. Such reversal of flow direction would result in reversal of direction of rotation of the machine and would damage or even destroy the machine. A proper control system for a plurality of centrifugal blowers discharging into a common header must provide automatic control of the connection of each blower with the header when the blower is in normal operation as, for instance, when the blower is being shut down; when the speed of operation of the blower is less than the speed at which the discharge pressure thereof is at least equal to the header pressure, and when the blower is being started. Such abnormal conditions as overspeed of the blower, breaking of the coupling between the blower and its driving machine, or failure of the blower driving means must also be considered and full protection must be provided to prevent damage or destruction of the blower in such cases.

It is, therefore, an object of the present invention to provide a control system for each of a plurality of centrifugal machines discharging into a common header.

Another object of the present invention is to provide a control system for each of a plurality of centrifugal machines discharging into a common header in which system means are provided to prevent the flow of fluid from the header into the centrifugal machine under any circumstances.

Another object of the invention is to provide a system for controlling a check valve which in turn controls the connection of each of a plurality of centrifugal machines to a header common to all of the machines.

Another object of the invention is to provide a system for controlling the connection of each of a plurality of centrifugal machines with a common header in response to the operation of the control system of the prime mover driving each of such machines.

Objects and advantages other than those above set forth will be apparent from the following description when read in connection with the accompanying drawing which somewhat diagrammatically illustrates one embodiment of the present invention.

Referring particularly to the drawing by characters of reference, reference numerals 1 designate outlets into consuming devices (not shown) from a header 2 common to a plurality of machines such as blowers or pumps, and herein indicated as blowers 3 of the centrifugal type. Each of the blowers 3 is connected with header 2 through a check valve generally designated by 4 and to be more specifically described hereinafter, and each of the blowers 3 is separately driven by a driving machine herein shown as a steam turbine 6 directly connected with its blower through a coupling 7. The intake of the blower is designated by 8 and the discharge conduits thereof are shown at 9.

Each of the turbo blower units comprising a blower and a driving turbine, is designed to maintain a predetermined pressure in the header 2 when operating alone or in conjunction with another unit or units. Such predetermined pressure being always maintained in the header, the check valves 4 are each designed to be opened by fluid pressure operated means only after the associated blower has come up to the speed required to deliver the required pressure to the header and are also designed to close as soon as the predetermined pressure is no longer maintained in the discharge conduit from the associated blower. The valve operating pressure is obtained from the lubricating system of the turbine responsive to the speed of the turbine as will be described hereinafter. Each check valve 4 comprises a valve body 11 which is eccentrically mounted within a substantially cylindrical casing 12. The valve body 11 is provided with a weight 13 or with other suitable means serving the purpose of biasing the valve in the closed position and is connected with a fluid pressure operated servomotor 14 which is connected with the pressure lubricating system of the turbine 6. The detailed construction of the check valve and a description of the operation thereof may be seen in an application for United States Letters Patent by G. L. Kollberg, Ser. No. 738,468, filed August 4, 1934, and assigned to Allis-Chalmers Manufacturing Company, the assignee of the present application.

Steam is delivered to the turbine 6 through a conduit 16 and discharges from the turbine to the conduit 17. Upon admission of the steam to the conduit 16, steam is admitted through a hand valve 18 and pressure operated valve 19 to an impulse wheel 21 forming a portion of an auxiliary oil pump, generally designated by 22. The impeller 23 of the pump 22 extends into an oil reservoir or sump 24. Oil is delivered from the pump 22 through a non-return valve 26 and an adjusting valve 27 to a regulating valve 28 which is controlled by the speed governor of the turbine generally indicated as 29. From the regulating valve 28 the oil is returned to the sump 24, the sump connection with the valve having been omitted to avoid unnecessary complication of the drawing. The oil from the pump 22 also acts through the adjusting valve 27 on the piston 31, acting against a spring 32, of a servomotor 33 for actuating a valve 34 which controls the connection of the pump 22 with the servomotor 14, or with the sump 24, connection of the valve 34 with the pump 22 being controlled through a hand valve 36 and an adjusting valve 37. A main oil pump 41 is connected with the shaft of the turbine 6 and is operated thereby in a manner well understood in the art. The main pump 41 draws oil from the sump 24 and delivers such oil under pressure through a non-return valve 42 to the discharge line thereof common to both the main pump 41 and the auxiliary pump 22. Oil is taken from the common discharge line of both oil pumps 22 and 41 through a pressure reducing valve 43 to the bearings of the turbine and blower by way of the conduits 46, 47, 48, and 49.

When the turbine and the blower are at rest, all of the portions of the system are in the position shown, that is, check valve 4 is closed, valve 34 is open, valve 36 is closed and valve 28 is open. Even though there is steam in pipe 16, valve 18 is then in closed position and valve 19 is open as shown. When it is desired to start the unit, valve 18 is opened to admit steam to the impulse wheel 21 of the auxiliary oil pump 22 which delivers pressure through the valves 26 and 27 to the valve 28 which remains open until the turbine 6 has reached the lowest speed at which the blower 3 could be connected to the header 2. After reaching such lowest speed, valve 28 is closed by the governor 29 and the oil pressure from both auxiliary oil pump 22 and main oil pump 41 acts through valve 27 on the piston 31 of the servomotor 33, against the action of the spring 32, to close the valve 34 and thereby shut off the connection of the servomotor 14 with the oil sump 24. The combined oil pressure also acts through the valve 37 on the valve 36 which is then manually opened to apply such pressure to the piston of the servomotor 14, to open the check valve 11 against the action of the weight 13 which biases such valve into the closed position. When the check valve is opened fully, the blower 3 delivers air to the header 2. The combined oil pressure from both oil pumps also acts on the diaphragm of the valve 19 to close off the steam line connection to the impulse wheel 21. The auxiliary oil pump is thus stopped and the pump 41 which is now up to speed, can supply the oil under pressure required for operation of the governor 29, for lubrication of the turbine and the blower and for maintaining the check valve 4 in the open position. Continued operation of the turbo blower unit and of the oil pump 41 retains the check valve 4 and the valve 34 in the open and closed positions respectively, as long as the unit remains in operation above a predetermined minimum speed. As soon as the speed decreases below such minimum, the speed of the governor 29 also decreases and the valve 28 is reopened. The reopening of valve 28 discharges pressure from the piston 32 of the servomotor 33 and the spring 32 returns the valve 34 to the opened position shown in the drawing. The weight 13 then returns the check valve 11 to the closed position and forces the piston of servomotor 14 back to the position shown in the drawing, the oil discharging to the sump 24 from the servomotor 33. All of the oil from the main oil pump 41 thus discharges to the sump 24 at the lower speeds of the unit when the blower is not operating at the required speed to force air into the header against the pressure maintained therein by other units connected thereto.

Each of the driven and driving machine units functions in the same manner and the several portions of each unit function in the same way. The primary purpose of the oil pump 22 is to provide sufficient oil for the proper lubrication of the unit during starting and to provide the oil pressure required for the starting operation of the speed governor, the nozzle valves, etc. for the turbine. After the unit has come up to speed, the governor operated discharge regulating valve 28 is closed and the oil pump 41 takes over the function of providing lubricating pressure and pressure for continued operation of the turbine as well as the function of providing pressure for operation of the check valve and to shut off the pump 22. The final control of the check valve is obtained from the valve 36 although such valve may be omitted, thus making operation of the system entirely automatic except for the manual operation of valve 18 to start the operation of the system and to prevent the system from restarting after it has once been shut down. It will thus be seen that the present invention provides simple and positive means for preventing reversal of flow from a header under pressure into a machine of the centrifugal type to which such reversal of flow direction would be damaging or even destructive.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a system for supplying fluid under pressure to a header, a plurality of units each comprising a driving machine and a driven machine, means responsive to the speed of and controlling the operation of said driving machine, a self-closing valve controlling the connection of each of said units with the header, fluid pressure operated means operating positively only for opening said valve, power driven means operable separately to produce a portion of the fluid pressure for opening said valve, means operable by said driving machine to produce a portion of the fluid pressure for opening said valve, said separately power driven means being partially controlled by the fluid pressure produced by said driving machine operable means, and means directly responsive to the means for controlling the speed of operation of said driving machine and indirectly controlling application of the fluid pressure to the first said means for opening said valve.

2. In a system for supplying fluid under pressure to a header, a plurality of units each comprising a driving machine and a driven machine, a self-closing check valve connecting said driven machine with the header, a fluid pressure operated servo-motor to cause opening of said check valve upon application of fluid pressure thereto, a pump driven by said driving machine to produce pressure for operating said servo-motor, means operated dependent on the speed of said driving machine for controlling the discharge from said pump, and pressure operated means controlled by said speed dependent means for controlling the application of pressure from said pump to said servomotor.

3. In a system for supplying fluid under pressure to a header, a plurality of units each comprising a driving machine and a driven machine, a self-closing check valve connecting said driven machine with the header, a fluid pressure operated servomotor to cause opening of said check valve upon application of fluid pressure thereto, a pump driven by said driving machine to produce pressure for operating said servomotor, a speed operated valve operated dependent on the speed of said driving machine for controlling the discharge from said pump, and a valve operated by pressure from said pump upon closure of said speed operated valve and controlling the application of pressure from said pump to said servomotor.

4. In a system for supplying fluid under pressure to a header, a plurality of units each comprising a driving machine and a driven machine, a self-closing check valve connecting said driven machine with the header, a fluid pressure operated servo-motor to cause opening of said check valve upon application of fluid pressure thereto, a pump driven by said driving machine to produce pressure for operating said servomotor, a speed responsive valve for partially controlling the discharge from said pump and operated dependent on the speed of said driving machine, a pressure operated valve for controlling application of fluid pressure to said servomotor, both of said valves cooperating to control the discharge from said pump, and a manually operable valve to control the rate of application of pressure from said pump to said servomotor upon closure of both of the pump discharge control valves.

5. In a system for supplying fluid under pressure to a header, a plurality of units each comprising a driving machine and a driven machine, a self-closing check valve connecting said driven machine wth the header, a fluid pressure operated servomotor to cause opening of said check valve upon application of fluid pressure thereto, a pump driven by said driving machine to produce a portion of the pressure for operating said servo-motor, a pump independently driven to aid the first said pump in producing pressure for operating said servomotor. means operated responsive to the speed of said driving machine for controlling the discharge from both said pumps, and pressure operated means controlled by said speed operated means for controlling the application of pressure from said pump to said servomotor.

6. In a system for supplying fluid under pressure to a header, a plurality of units each comprising a driving machine and a driven machine, a self-closing check valve connecting said driven machine with the header, a fluid pressure operated servomotor to cause opening of said check valve upon application of fluid pressure thereto, a pump driven by said driving machine to produce a portion of the pressure for operating said servo-motor, a pump independently driven to aid the first said pump in producing the full pressure required for operating said servomotor, pressure operated means for controlling the operation of the second said pump, means operated by the speed of said driving machine for controlling the discharge from both said pumps, and pressure operated means controlled by said speed operated means for controlling the application of pressure from said pump to said servomotor, the first said pressure operated means being operable dependent on the operation of said speed operated means.

7. In a system for supplying fluid under pressure to a header, a plurality of units each comprising a driving machine and a driven machine, a self-closing check valve for connecting the driven machine with the header, a fluid pressure operated servomotor to cause opening only of said check valve upon application of fluid pressure thereto, a pump driven by the driving machine to produce fluid pressure for operating said servomotor, a speed responsive valve for partially controlling the discharge from said pump, a pressure operated valve for controlling the application of fluid pressure to said servomotor, both said speed responsive and said pressure operated valve cooperating to control the discharge from said pump, a manually operable valve for regulating the rate of fluid flow from said pump to said speed responsive valve and for regulating the rate of fluid flow to said pressure operated valve, and a manually operable valve cooperating with said pressure operated valve only for controlling the rate of fluid flow from said pump to said servomotor.

8. In a system for supplying fluid under pressure to a header, a plurality of units each comprising a driving machine and a driven machine delivering fluid under pressure to the header, a self-closing check valve controlling connection of said unit with the header, a fluid pressure operated servomotor for opening said check valve and operable in one direction only upon application of fluid pressure thereto, a pump driven by the fluid operating the driving machine and independently thereof and capable of producing fluid pressure for initiating operation of said servomotor, said pump producing pressure for lubrication of said unit during starting and for operation of speed control means for the driving machine, a pressure responsive valve controlling operation of said pump, and a valve operable responsive to the speed of the driving machine for controlling the discharge of fluid pressure from said pump, said speed responsive valve controlling operation of said pressure responsive valve.

9. In a system for supplying fluid under pressure to a header, a plurality of units each comprising a driving machine and a driven machine delivering fluid under pressure to the header, a self-closing check valve controlling connection of said unit with the header, a fluid pressure operated servomotor for opening said check valve and operable in one direction only upon application of fluid pressure thereto, a main pump driven by the driving machine to produce a portion of the pressure for operating said servomotor, an auxiliary pump driven by the fluid operating the driving machine and independently thereof for aiding said main pump in producing pressure for operating said servomotor, said main pump cooperating with said auxiliary pump during starting of said unit, a pressure responsive valve controlling operation of said auxiliary pump, the pressure produced by said main pump causing closing of said valve upon attainment of normal operating speed of said unit, and a valve operable responsive to the speed of the driving machine for controlling the discharge of fluid pressure from said pumps, said speed responsive valve controlling operation of said pressure responsive valve.

10. In a system for supplying fluid under pressure to a header, a plurality of units each comprising a driving machine and a driven machine delivering fluid under pressure to the header, a self-closing check valve controlling connection of said unit with the header, a fluid pressure operated servomotor for opening said check valve and operable in one direction only upon application of fluid pressure thereto, a main pump driven by the driving machine to produce a portion of the pressure for operating said servomotor, an auxiliary pump driven by the fluid operating the driving machine and independently thereof for aiding said main pump in producing pressure for operating said servomotor, said main pump cooperating with said auxiliary pump during starting of said unit, a pressure responsive valve controlling operation of said auxiliary pump, the pressure produced by said main pump causing closing of said valve upon attainment of normal operating speed of said unit, a valve operable responsive to the speed of the driving machine for controlling the discharge of fluid pressure from said pumps, said speed responsive valve controlling operation of said pressure responsive valve, a second pressure operated valve for controlling the application of fluid pressure to said servomotor, a manually operable valve for regulating the rate of fluid flow from said pumps to said speed responsive valve and for regulating the rate of fluid flow to the operating means of said second pressure operated valve, and a manually operable valve cooperating with said second pressure operated valve for controlling the rate of fluid pressure flow to said servomotor.

HANS P. DAHLSTRAND.
HERMAN G. SEAHOLM.